(12) United States Patent
Mai et al.

(10) Patent No.: US 12,315,929 B2
(45) Date of Patent: May 27, 2025

(54) SODIUM-CHROMIUM-TITANIUM-MANGANESE PHOSPHATE SELF-SUPPORTING ELECTRODE MATERIAL, AND PREPARATION METHOD THEREFOR AND USE THEREOF

(71) Applicant: WUHAN UNIVERSITY OF TECHNOLOGY, Wuhan (CN)

(72) Inventors: Liqiang Mai, Wuhan (CN); Ping Hu, Wuhan (CN); Boyu Xing, Wuhan (CN); Ting Zhu, Wuhan (CN); Liang Zhou, Wuhan (CN)

(73) Assignee: WUHAN UNIVERSITY OF TECHNOLOGY

( * ) Notice: Subject to any disclaimer, the term of this patent is extended or adjusted under 35 U.S.C. 154(b) by 0 days.

(21) Appl. No.: 18/624,159

(22) Filed: Apr. 2, 2024

(65) Prior Publication Data

US 2024/0266533 A1     Aug. 8, 2024

Related U.S. Application Data

(63) Continuation of application No. PCT/CN2023/075314, filed on Feb. 10, 2023.

(30) Foreign Application Priority Data

Mar. 9, 2022   (CN) .......................... 202210226449.4

(51) Int. Cl.
  *H01M 4/58*      (2010.01)
  *H01B 1/06*      (2006.01)
  (Continued)

(52) U.S. Cl.
  CPC ............ *H01M 4/5825* (2013.01); *H01B 1/06* (2013.01); *H01M 4/0411* (2013.01); *H01M 2004/028* (2013.01)

(58) Field of Classification Search
  CPC .. H01B 1/00; H01B 1/06; H01M 4/58; H01M 4/5825
  See application file for complete search history.

(56) References Cited

U.S. PATENT DOCUMENTS 9,490,482 B2   11/2016   Wietelmann
9,660,253 B2    5/2017   Nose
(Continued)

FOREIGN PATENT DOCUMENTS

CN    107492630 A    12/2017
CN    108461734 A     8/2018
(Continued)

OTHER PUBLICATIONS

Petruleviciene et al "Electrochemical Performance of NASICON-structured Na3-X V2-xTix(PO4)3 (0.0<x<1.0) as aqueous Na-ion battery positive electrodes", Electrochimica Acta 424 (2022) 140580.*
(Continued)

*Primary Examiner* — Mark Kopec
(74) *Attorney, Agent, or Firm* — True Shepherd LLC; Andrew C. Cheng (57) ABSTRACT

The present disclosure relates to the field of sodium-ion batteries and discloses a sodium-chromium-titanium-manganese phosphate self-supporting electrode material, and a preparation method therefor and use thereof; the sodium-chromium-titanium-manganese phosphate self-supporting electrode material is a composite material of sodium-chromium-titanium-manganese phosphate and carbon, and the sodium-chromium-titanium-manganese phosphate has a chemical formula of $Na_{3+x}Cr_xTi_{1-x}Mn(PO_4)_3$, wherein $0<x<1$. The sodium-chromium-titanium-manganese phosphate self-supporting electrode material provided by the present disclosure has a brand-new chemical formula and crystal structure, and an electrode prepared thereby does not need a current collector, a binder, or additional conductive (Continued)

carbon, greatly improving the overall energy density of the electrode. When used in the sodium-ion battery, the electrode can realize multi-electron electrochemical reactions, provide excellent electrochemical performance, and especially, significantly improve the cycling stability of the material, exhibiting high voltage, high capacity, excellent rate performance, and a broad commercial application prospect.

7 Claims, 3 Drawing Sheets

(51) Int. Cl.
*H01M 4/04* (2006.01)
*H01M 4/02* (2006.01)

(56) References Cited

U.S. PATENT DOCUMENTS

| | | | |
|---|---|---|---|
| 10,026,520 B2 * | 7/2018 | Kim | H01M 10/054 |
| 10,777,816 B2 | 9/2020 | Baek | |
| 12,148,916 B2 * | 11/2024 | Yuk | H01M 10/054 |
| 2022/0123303 A1 * | 4/2022 | Liu | H01M 4/136 |

FOREIGN PATENT DOCUMENTS

| | | | | |
|---|---|---|---|---|
| CN | 108963209 A | | 12/2018 | |
| CN | 111261870 A | | 6/2020 | |
| CN | 113764662 A | | 12/2021 | |
| CN | 113929069 A | * | 1/2022 | C01B 25/45 |
| CN | 114613997 A | | 6/2022 | |

OTHER PUBLICATIONS

Gandi et al "Glass-Ceramic Na [(Zr/Cr)x(Sc/Ti) (PO4)3 Electrolyte Materials for Na-Ion Full-Cell Application", Integrated Ferroelectrics An International Journal vol. 238, 2023—Issue 1 (Abstract).*
CN 113764662 (pub date Dec. 2021) English language machine translation.*
Form PCT/ISA/237 mailed May 2023 English language translation.*
Internation Search Report of PCT/CN2023/075314,Mailed May 17, 2023.

* cited by examiner

SODIUM-CHROMIUM-TITANIUM-MANGANESE PHOSPHATE SELF-SUPPORTING ELECTRODE MATERIAL, AND PREPARATION METHOD THEREFOR AND USE THEREOF

CROSS-REFERENCE TO RELATED APPLICATIONS

This application is a continuation of International Patent Application No. PCT/CN2023/075314 with a filing date of Feb. 10, 2023, designating the United States, and further claims priority to Chinese Patent Application No. 202210226449.4 with a filing date of Mar. 9, 2022. The content of the aforementioned application, including any intervening amendments thereto, is incorporated herein by reference.

TECHNICAL FIELD

The present disclosure relates to the technical field of nanomaterials and electrochemistry, and in particular, to a sodium-chromium-titanium-manganese phosphate self-supporting electrode material and a preparation method therefor and use thereof.

BACKGROUND

As one of the major representatives of clean energy, lithium-ion batteries are characterized by relatively high energy density, long cycle life, simple structure, light weight, and have become the first choice of power storage systems in the past 30 years. However, their application in the field of large-scale energy storage is greatly limited due to the shortage and high cost of lithium resources. Therefore, it is extremely urgent to develop novel low-cost and efficient energy storage batteries. Sodium and lithium belong to the same main group, both of which have similar chemical properties. Meanwhile, sodium resources are high in abundance, wide in distribution, and low in raw material cost. As a result, sodium-ion batteries are considered as one of the first choices for large-scale energy storage systems in the future and have become a research hotspot and frontier in the field of energy storage materials and devices currently.

In an entire sodium-ion battery energy storage system, the cathode material has an important influence on the key indicators of the battery, including operating voltage, energy density, power density, cycle life, and the like. Since the radius of a sodium ion (0.97 Å) is much larger than that of a lithium ion (0.68 Å), the resistance received by the sodium ion during intercalation/deintercalation is greater, and the damage to the structure of an electrode material is also more serious. Among various cathode materials, polyanion-type sodium superionic conductor phosphate has become one of the most promising materials due to its unique sodium superionic conductor (NASICON) structure, high theoretical energy density, good thermodynamic stability, and large internal ion diffusion channel. However, such material has low intrinsic electronic conductivity, resulting in its low coulombic efficiency and poor cycling stability.

At present, $Na_3V_2(PO_4)_3$ is the most widely researched NASICON-type cathode material of a sodium-ion battery, which has a theoretical specific capacity of 117 mAh/g and a stable voltage platform at 3.4 V. However, the number of voltage platforms is limited, which forces people to develop a NASICON-type cathode material with better performance, safety, and environmental friendliness. At the same time, the electron transfer number of active metals participating in reactions of such materials is not high and the electronic conductivity is generally very low, severely affecting the full exertion of its electrochemical performance. Therefore, how to improve the cycling stability of a NASICON-type material and improve its rate performance has become the focus of current research.

SUMMARY OF PRESENT INVENTION

In view of the foregoing, the present disclosure provides a sodium-chromium-titanium-manganese phosphate self-supporting electrode material and a preparation method therefor and use thereof to solve the problem of poor electrochemical performance of existing NASICON-type sodium-ion battery cathode materials.

To achieve the above objective, the present disclosure makes use of the following technical solution:

a sodium-chromium-titanium-manganese phosphate self-supporting electrode material, wherein the sodium-chromium-titanium-manganese phosphate self-supporting electrode material is a composite material of sodium-chromium-titanium-manganese phosphate and carbon, and the sodium-chromium-titanium-manganese phosphate has a chemical formula of $Na_{3+x}Cr_xTi_{1-x}Mn(PO_4)_3$, wherein $0<x<1$.

A second objective of the present disclosure is to provide a method for preparing the above sodium-chromium-titanium-manganese phosphate self-supporting electrode material, including the following steps:

S1: dissolving a carbon-containing polymer into a solvent to obtain a solution;

S2: mixing a sodium source, a manganese source, a titanium source, a chromium source, and a phosphorus source with the solution to obtain a spinning solution, and subjecting the spinning solution to electrostatic spinning to obtain a spinning product; and S3: after pretreating the spinning product, calcining the same to obtain the sodium-chromium-titanium-manganese phosphate self-supporting electrode material.

Optionally, in the step S1, the carbon-containing polymer includes at least one of polyacrylonitrile, polyethylene oxide, polyvinylidene fluoride, polymethacrylate, polyvinyl carbazole, polybenzimidazole, polyethylene terephthalate, polymethyl methacrylate, polystyrene, polyurethane, polylactic acid, polyvinylpyrrolidone, and polyvinyl alcohol.

Optionally, in the step S1, the solvent includes at least one of dimethylformamide, dimethylacetamide, dimethyl sulfoxide, ethylene carbonate, and water.

Optionally, in the step S2, based on a molar ratio of sodium, manganese, titanium, chromium, phosphate, and carbon, the sodium source, the manganese source, the titanium source, the chromium source, the phosphorus source, and the carbon-containing polymer have a molar ratio of $(3+x):1:(1-x):x:3:(0.2-5)$, wherein $0<x<1$.

Optionally, the sodium source includes at least one of disodium hydrogen phosphate, sodium dihydrogen phosphate, sodium acetate, sodium oxalate, sodium citrate, sodium carbonate, sodium bicarbonate, and sodium hydroxide; the manganese source includes at least one of manganese acetate, manganese nitrate, manganese carbonate, and manganese acetylacetonate; the titanium source includes at least one of dihydroxybis(ammonium lactato)titanium(IV), titanium dioxide, tetrabutyl titanate, isopropyl titanate, and tetraethyl titanate; the chromium source includes at least one of chromium acetate, chromium acetate hydroxide, and chromium nitrate; and the phosphorus source includes at least one of phosphoric acid, disodium hydrogen phosphate, sodium dihydrogen phosphate, and ammonium dihydrogen phosphate.

Optionally, in the step S2, conditions for the electrostatic spinning include a voltage of 10 kV to 30 kV, a distance of 10 cm to 25 cm between a spinning nozzle and a receiver, and an advancing speed of 0.01 mm/min to 0.5 mm/min.

Optionally, in the step S3, conditions for the pretreatment include a temperature under an air atmosphere in a range of 100° C. to 400° C., pretreatment time in a range of 30 min to 300 min, and a pretreatment temperature rise rate in a range of 1° C. to 10° C.

Optionally, in the step S3, conditions for the calcination include protection by inert or reducing gas, a temperature rise rate of a tube furnace in a range of 2° C./min to 10° C./min, a calcination temperature in a range of 600° C. to 850° C., and calcination time in a range of 3 h to 24 h.

A third objective of the present disclosure is to provide the use of the above sodium-chromium-titanium-manganese phosphate self-supporting electrode material as a cathode active material for a sodium-ion battery.

Compared with the prior art, the present disclosure has the following advantages:

(1) The sodium-chromium-titanium-manganese phosphate self-supporting electrode material provided by the present disclosure has a brand-new chemical formula and crystal structure, and an electrode prepared thereby does not need a current collector, a binder, or additional conductive carbon, greatly improving the overall energy density of the electrode.

(2) The method for preparing a sodium-chromium-titanium-manganese phosphate self-supporting electrode material provided by the present disclosure is simple and the product is environmentally friendly and cost-effective; and the voltage platform of the material can be regulated and controlled by adjusting the ratio of chromium and manganese in the material, optimizing its electrical performance.

(3) The sodium-chromium-titanium-manganese phosphate self-supporting electrode material provided by the present disclosure is used as a sodium-ion cathode material for a sodium-ion battery and exhibits excellent electrochemical performance, wherein the sodium-ion battery assembled with the $Na_{3.5}Cr_{0.5}Ti_{0.5}Mn(PO_4)_3$ self-supporting electrode material has a specific capacity of 160 mAh/g at a current density of 50 mA/g and a capacity retention rate of 92% after 100 cycles, and still has a specific capacity of 117 mAh/g after 100 cycles at a large current density of 200 mA/g.

BRIEF DESCRIPTION OF THE DRAWINGS

To describe the technical solutions of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may further derive other accompanying drawings from these accompanying drawings without creative efforts.

DETAILED DESCRIPTION OF THE EMBODIMENTS

To make the foregoing objectives, features, and advantages of the present disclosure clearer and more comprehensible, the embodiments of the present disclosure will be further described in detail below with reference to the accompanying drawings.

It should be noted that, in the description of the embodiments of the present application, the description of the term "some embodiments" means that the specific features, structures, materials, or characteristics described in combination with the embodiments or examples are included in at least one embodiment or example of the present disclosure. In this specification, the schematic representation of the above term does not necessarily refer to the same embodiment or example. Moreover, the specific features, structures, materials, or characteristics described may be combined in any suitable manner in any one or more embodiments or examples.

In the embodiments of the present disclosure, "in a range of . . . " includes both end values, for example, "in a range of 1 to 100" includes both end values of 1 and 100.

An embodiment of the present disclosure provides a sodium-chromium-titanium-manganese phosphate self-supporting electrode material, wherein the sodium-chromium-titanium-manganese phosphate self-supporting electrode material is a composite material of sodium-chromium-titanium-manganese phosphate and carbon, and the sodium-chromium-titanium-manganese phosphate has a chemical formula of $Na_{3+x}Cr_xTi_{1-x}Mn(PO_4)_3$, wherein 0<x<1.

Here, the sodium-chromium-titanium-manganese phosphate self-supporting electrode material has a three-dimensional network framework structure which is composed of carbon-coated sodium-chromium-titanium-manganese phosphate nanofibers; an active material of the sodium-chromium-titanium-manganese phosphate self-supporting electrode material is sodium-chromium-titanium-manganese phosphate; and the sodium-chromium-titanium-manganese phosphate has a crystal structure of a sodium superionic conductor, is a trigonal system, and belongs to an R-3c space group. Replacing titanium with a proper amount of chromium in a sodium-manganese-titanium phosphate material can fully exert the electrochemical effects of manganese and chromium while ensuring the stability of the NASICON structure (manganese cannot form the NASICON structure individually), and effectively improve the average voltage platform of the material (voltage platforms: $Cr^{3+}/Cr^{4+}$ (4.4V vs. $Na^+/Na$), $Mn^{3+}/Mn^{4+}$ (4.1V), $Mn^{2+}/Mn^{3+}$ (3.6V), $Ti^{3+}/Ti^{4+}$ (2.1V)).

Therefore, the sodium-chromium-titanium-manganese phosphate self-supporting electrode material provided by the embodiment of the present disclosure has a brand-new chemical formula and crystal structure, and an electrode prepared thereby does not need a current collector, a binder, or additional conductive carbon, and can be directly used for assembling a sodium-ion battery, greatly improving the overall energy density of the electrode.

It can be understood that, in general, a method for preparing an electrode material mainly makes use of a conventional blade-coating method, that is, after an active material, a binder, and conductive carbon are prepared into slurry, the slurry is coated on a current collector by using a blade. This process takes a long time and needs more energy and time in the electrode preparation process. Furthermore, the conductive carbon and the current collector occupy a certain ratio of weight, limiting the loading amount of active substances and the energy density of the battery. The binder may be degraded due to many factors, resulting in the separation of the electrode material from the current collector to cause uncontrollable side reactions.

In the prior art, a self-supporting electrode is developed to improve the overall energy density of the electrode. The self-supporting electrode refers to an electrode in which an electrode active material can be used independently as an electrode to assemble a battery, without relying on the current collector. It has the advantages of no need for additional binder, conductive agent, and current collector, features good mechanical properties and higher specific capacity and energy density, can be directly used as an electrode, and extremely improves the mass ratio of active substances in the electrode, thereby improving the overall energy density of the battery. However, at present, methods for preparing the self-supporting electrode mainly include using cotton cloth/wood as the self-supporting electrode, conducting suction filtration on carbon nanotubes/graphene to form a film, electrostatic spinning, and the like. In these methods, the electrostatic spinning is a preparation method with the greatest commercialization and industrialization potential.

The embodiments of the present disclosure creatively apply the electrostatic spinning technology to a preparation process of the electrode material to improve the electrochemical performance of the electrode material.

Specifically, a method for preparing the above sodium-chromium-titanium-manganese phosphate self-supporting electrode material is provided, including the following steps:
S1: dissolve a carbon-containing polymer into a solvent to obtain a solution;
S2: mix a sodium source, a manganese source, a titanium source, a chromium source, and a phosphorus source with the solution to obtain a spinning solution, and subject the spinning solution to electrostatic spinning to obtain a spinning product; and
S3: after pretreating the spinning product, calcining the same to obtain the sodium-chromium-titanium-manganese phosphate self-supporting electrode material.

Specifically, in the step S1, the carbon-containing polymer includes at least one of polyacrylonitrile, polyethylene oxide, polyvinylidene fluoride, polymethacrylate, polyvinyl carbazole, polybenzimidazole, polyethylene terephthalate, polymethyl methacrylate, polystyrene, polyurethane, polylactic acid, polyvinylpyrrolidone, and polyvinyl alcohol.

The solvent includes at least one of dimethylformamide, dimethylacetamide, dimethyl sulfoxide, ethylene carbonate, and water.

Specifically, in the step S2, based on a molar ratio of sodium, manganese, titanium, chromium, phosphate, and carbon, the sodium source, the manganese source, the titanium source, the chromium source, the phosphorus source, and the carbon-containing polymer have a molar ratio of $(3+x):1:(1-x):x:3:(0.2-5)$, wherein $0<x<1$.

The voltage platform of the material can be significantly regulated and controlled by adjusting the ratio of chromium and manganese in the material, optimizing the electrical performance of the sodium-chromium-titanium-manganese phosphate self-supporting electrode material.

The sodium source includes at least one of disodium hydrogen phosphate, sodium dihydrogen phosphate, sodium acetate, sodium oxalate, sodium citrate, sodium carbonate, sodium bicarbonate, and sodium hydroxide; the manganese source includes at least one of manganese acetate, manganese nitrate, manganese carbonate, and manganese acetylacetonate; the titanium source includes at least one of dihydroxybis(ammonium lactato)titanium(IV), titanium dioxide, tetrabutyl titanate, isopropyl titanate, and tetraethyl titanate; the chromium source includes at least one of chromium acetate, chromium acetate hydroxide, and chromium nitrate; and the phosphorus source includes at least one of phosphoric acid, disodium hydrogen phosphate, sodium dihydrogen phosphate, and ammonium dihydrogen phosphate.

Preferably, conditions for the electrostatic spinning include a voltage of 10 kV to 30 kV, a distance of 10 cm to 25 cm between a spinning nozzle and a receiver, and an advancing speed of 0.01 mm/min to 0.5 mm/min.

Specifically, in the step S3, conditions for the pretreatment include a temperature under an air atmosphere in a range of 100° C. to 400° C., pretreatment time in a range of 30 min to 300 min, and a pretreatment temperature rise rate in a range of 1° C. to 10° C.

Preferably, conditions for the calcination include protection by inert or reducing gas, a temperature rise rate of a tube furnace in a range of 2° C./min to 10° C./min, a calcination temperature in a range of 600° C. to 850° C., and calcination time in a range of 3 h to 24 h.

After the spinning product is pretreated and calcined, the carbon polymer is uniformly coated on the surface of the sodium-chromium-titanium-manganese phosphate, which effectively inhibits the agglomeration of sodium-chromium-titanium-manganese phosphate particles in the carbonization process, such that the obtained sodium-chromium-titanium-manganese phosphate particles are smaller (10 nm to 30 nm) and the transport paths of electrons and sodium ions are shortened, and therefore, the sodium-chromium-titanium-manganese phosphate self-supporting electrode material has excellent rate performance.

Furthermore, the sodium-chromium-titanium-manganese phosphate coated with a carbon layer, which is prepared by in-situ sintering of precursors, can inhibit the volume change of active materials in the cycling process and maintain relatively good structural stability and relatively high reversible capacity in the long-term cycling process.

The preparation method provided by the embodiment of the present disclosure is simple; and the product is environmentally friendly and cost-effective, has a potential for large-scale application, facilitates market promotion, and has a broad application prospect in the application field of sodium ion batteries and a broad commercial application prospect.

Another embodiment of the present disclosure provides the use of the above sodium-chromium-titanium-manganese phosphate self-supporting electrode material as a cathode active material for a sodium-ion battery.

The self-supporting electrode provided by the present disclosure is a three-dimensional conductive carbon network structure composed of the carbon-coated sodium-chromium-titanium-manganese phosphate nanofibers, facilitates full impregnation of an electrolyte, and is capable of ensuring rapid transport of electrons and sodium ions. When used in a sodium-ion battery, the electrode can realize multi-electron electrochemical reactions, provide excellent electrochemical performance, and especially, significantly improve the cycling stability of the material, exhibiting high voltage, high capacity, and excellent rate performance.

On the basis of the above embodiments, the following examples are provided to further describe the present disclosure. It should be understood that these examples are only intended to illustrate the present disclosure rather than to limit the scope of the present disclosure. The experimental methods in the following examples are generally carried out according to the conditions recommended by the manufacturer if no conditions are indicated herein. The percentages and parts are calculated by mass, unless otherwise stated.

Example 1

This example provides a method for preparing a sodium-chromium-titanium-manganese phosphate self-supporting electrode material, including the following steps:
1) 1 g of polyacrylonitrile (PAN, with a number-average molecular weight of 150000) was dissolved into 12 mL of dimethyl formamide (DMF), and a resulting mixture was stirred until the polyacrylonitrile was completely dissolved to obtain a solution;
2) 2 mmol of a manganese source, 1 mmol of a titanium source, 1 mmol of a chromium source, 2.33 mmol of anhydrous sodium citrate, and 0.41 mL of phosphoric acid (85%) were weighed and added into the solution in sequence, and a resulting mixture was mixed at 70° C. to obtain a spinning solution; the spinning solution was transferred into a 10 mL disposable syringe and then the syringe was put into an electrostatic spinning device for electrostatic spinning; a circle of aluminum foil was wrapped around a receiving roller to receive an obtained spinning product; and conditions for the electrostatic spinning included: an advancing speed of 0.06 mm/min, a distance of 12 cm between a spinning nozzle (syringe needle) and a receiver (the receiving roller), and a spinning voltage of 18 kV.
3) The obtained spinning product was removed from the aluminum foil, heated up to 300° C. at 5° C./min for 2 h in a muffle furnace, and then heated temperature at 700° C. for 6 h under an argon atmosphere in a tube furnace at a rate of 3° C./min to obtain the sodium-chromium-titanium-manganese phosphate self-supporting electrode material $Na_{3.5}Cr_{0.5}Ti_{0.5}Mn(PO_4)_3$.

Figure 1:
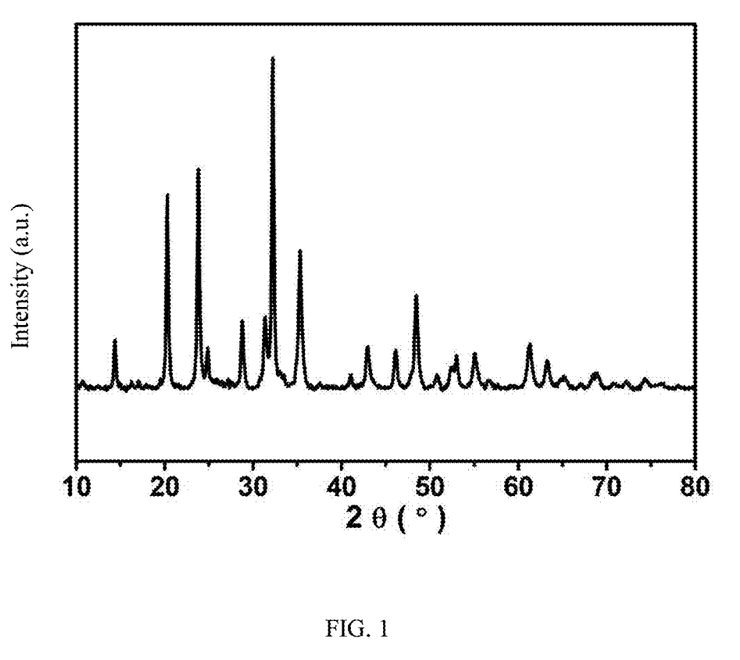
FIG. 1 shows an X-ray diffraction pattern of the $Na_{3.5}Cr_{0.5}Ti_{0.5}Mn(PO_4)_3$ according to an embodiment of the present disclosure.
Figure 2:
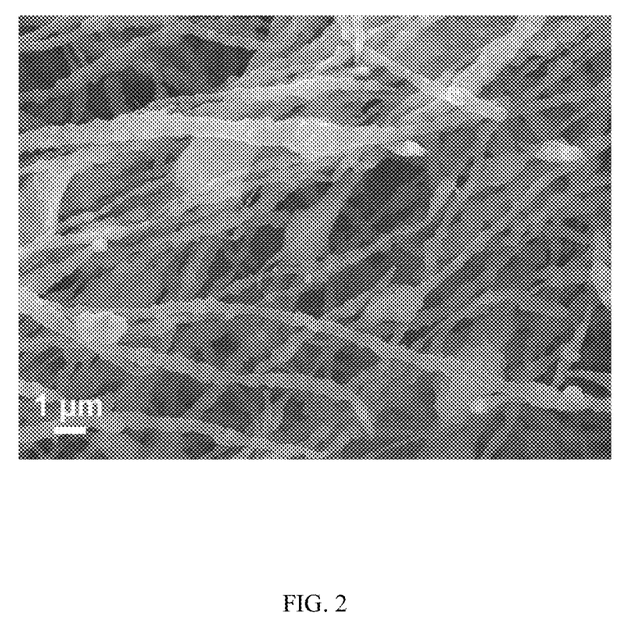
FIG. 2 shows a scanning electron microscope image of the $Na_{3.5}Cr_{0.5}Ti_{0.5}Mn(PO_4)_3$ according to an embodiment of the present disclosure.

The sodium-chromium-titanium-manganese phosphate self-supporting electrode material $Na_{3.5}Cr_{0.5}Ti_{0.5}Mn(PO_4)_3$ prepared according to Example 1 was tested and the graphical results are as shown in FIG. 1 and FIG. 2.

FIG. 1 shows an X-ray diffraction (XRD) pattern of the $Na_{3.5}Cr_{0.5}Ti_{0.5}Mn(PO_4)_3$ flexible self-supporting electrode material prepared according to Example 1. It can be seen from FIG. 1 that the $Na_{3.5}Cr_{0.5}Ti_{0.5}Mn(PO_4)_3$ flexible self-supporting electrode material has a typical NASICON structure, is a trigonal crystal system, and belongs to an R-3c space group.

FIG. 2 shows a scanning electron microscope (SEM) image of the $Na_{3.5}Cr_{0.5}Ti_{0.5}Mn(PO_4)_3$ flexible self-supporting electrode material prepared according to Example 1. It can be seen from FIG. 2 that the $Na_{3.5}Cr_{0.5}Ti_{0.5}Mn(PO_4)_3$ flexible self-supporting electrode material is a three-dimensional structure composed of nanowires, and the diameter of the nanowires is 50 nm to 200 nm.

The $Na_{3.5}Cr_{0.5}Ti_{0.5}Mn(PO_4)_3$ prepared according to Example 1 was used as a cathode material of a sodium-ion battery to prepare the sodium-ion battery by a method including the following steps:
the $Na_{3.5}Cr_{0.5}Ti_{0.5}Mn(PO_4)_3$ was taken as a cathode of the sodium-ion battery, a solution of 1 M $NaClO_4$ in EC+PC(1:1)+5% FEC as an electrolyte, a sodium sheet as an anode, and Celgard as a diaphragm to assemble the sodium-ion button battery with 2016 cathode and anode cases. The sodium-ion battery was tested and the graphical results are as shown in FIG. 3.

Figure 3:
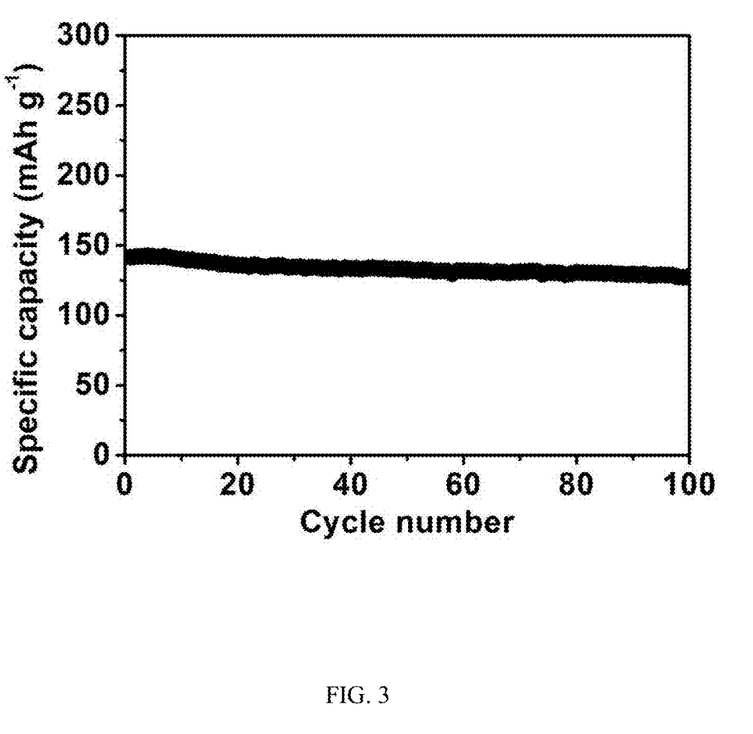
FIG. 3 shows a cycling performance curve of a sodium-ion battery assembled with the $Na_{3.5}Cr_{0.5}Ti_{0.5}Mn(PO_4)_3$ at a current density of 200 mA/g according to an embodiment of the present disclosure.

FIG. 3 shows a cycling performance curve of the sodium-ion battery at a current density of 200 mA/g. It can be seen from FIG. 3 that the sodium-ion battery assembled with the $Na_{3.5}Cr_{0.5}Ti_{0.5}Mn(PO_4)_3$ has an average discharge voltage of 3.0 V, a specific discharge capacity of 128 mAh/g after 100 cycles at a current density of 200 mA/g, and a capacity retention rate of more than 90%.

Example 2

This example provides a method for preparing a sodium-chromium-titanium-manganese phosphate self-supporting electrode material, which is different from Example 1 in that:
in the step 1), 0.8 g of polyacrylonitrile was dissolved into 12 mL of dimethyl formamide (DMF), and a resulting mixture was stirred until the polyacrylonitrile was completely dissolved to obtain a solution;
in the step 2), conditions for the electrostatic spinning included: an advancing speed of 0.08 mm/min, a distance of 18 cm between a spinning nozzle (syringe needle) and a receiver (the receiving roller), and a spinning voltage of 20 kV; and
the remaining steps and parameters were the same as those in Example 1 to obtain the sodium-chromium-titanium-manganese phosphate self-supporting electrode material $Na_{3.5}Cr_{0.5}Ti_{0.5}Mn(PO_4)_3$.

The $Na_{3.5}Cr_{0.5}Ti_{0.5}Mn(PO_4)_3$ prepared according to Example 2 was used as a cathode material of a sodium-ion battery to prepare the sodium-ion battery according to the above method, and the sodium-ion battery was tested.

It was measured that the sodium-ion battery assembled with the $Na_{3.5}Cr_{0.5}Ti_{0.5}Mn(PO_4)_3$ had an average discharge voltage of 3.1 V, a specific discharge capacity of 138 mAh/g after 50 cycles at a current density of 50 mA/g, and a capacity retention rate of more than 90%.

Example 3

This example provides a method for preparing a sodium-chromium-titanium-manganese phosphate self-supporting electrode material, which is different from Example 1 in that:
in the step 1), 0.8 g of polyacrylonitrile was dissolved into 10 mL of dimethyl formamide (DMF), and a resulting mixture was stirred until the polyacrylonitrile was completely dissolved to obtain a solution;
in the step 2), 2 mmol of a manganese source, 1.6 mmol of a titanium source, 0.4 mmol of a chromium source, 2.13 mmol of anhydrous sodium citrate, and 0.41 mL of phosphoric acid (85%) were weighed and added into the solution in sequence, and a resulting mixture was mixed at 70° C. to obtain a spinning solution; the spinning solution was transferred into an 8 mL disposable syringe and then the syringe was put into an electrostatic spinning device for electrostatic spinning;
in the step 3), the obtained spinning product was heated up to 300° C. at 2° C./min for 2 h in a muffle furnace, and then was heated to 750° C. under an argon atmosphere in a tube furnace at a rate of 3° C./min for 6 h to obtain the sodium-chromium-titanium-manganese phosphate self-supporting electrode material $Na_{3.2}Cr_{0.2}Ti_{0.8}Mn(PO_4)_3$; and the remaining steps and parameters were the same as those in Example 1.

The $Na_{3.2}Cr_{0.2}Ti_{0.8}Mn(PO_4)_3$ prepared according to Example 3 was used as a cathode material of a sodium-ion battery to prepare the sodium-ion battery according to the above method, and the sodium-ion battery was tested.

It was measured that the sodium-ion battery assembled with the $Na_{3.2}Cr_{0.2}Ti_{0.8}Mn(PO_4)_3$ had an average discharge voltage of 2.74 V, a specific discharge capacity of 145 mAh/g after 50 cycles at a current density of 50 mA/g, and a capacity retention rate of more than 92%.

Example 4

This example provides a method for preparing a sodium-chromium-titanium-manganese phosphate self-supporting electrode material, which is different from Example 1 in that:
in the step 1), 0.8 g of polyacrylonitrile was dissolved into 10 mL of dimethyl formamide (DMF), and a resulting mixture was stirred until the polyacrylonitrile was completely dissolved to obtain a solution;
in the step 2), 2 mmol of a manganese source, 1 mmol of a titanium source, 1 mmol of a chromium source, 2.4 mmol of anhydrous sodium citrate, and 0.41 mL of phosphoric acid (85%) were weighed and added into the solution in sequence, and a resulting mixture was mixed at 70° C. to obtain a spinning solution; the spinning solution was transferred into an 8 mL disposable syringe and then the syringe was put into an electrostatic spinning device for electrostatic spinning; and conditions for the electrostatic spinning included: an advancing speed of 0.08 mm/min, a distance of 12 cm between a spinning nozzle (syringe needle) and a receiver (the receiving roller), and a spinning voltage of 14 kV;
in the step 3), the spinning product was heated to 300° C. at 2° C./min for 2 h in a muffle furnace; and
the remaining steps and parameters were the same as those in Example 1 to obtain the sodium-chromium-titanium-manganese phosphate self-supporting electrode material $Na_{3.6}Cr_{0.6}Ti_{0.4}Mn(PO_4)_3$.

The $Na_{3.6}Cr_{0.6}Ti_{0.4}Mn(PO_4)_3$ prepared according to Example 4 was used as a cathode material of a sodium-ion battery to prepare the sodium-ion battery according to the above method, and the sodium-ion battery was tested.

It was measured that the sodium-ion battery assembled with the $Na_{3.6}Cr_{0.6}Ti_{0.4}Mn(PO_4)_3$ had an average discharge voltage of 3.2V, a specific discharge capacity of 125 mAh/g after 50 cycles at a current density of 50 mA/g, and a capacity retention rate of more than 80%.

Example 5

This example provides a method for preparing a sodium-chromium-titanium-manganese phosphate self-supporting electrode material, which is different from Example 1 in that:
in the step 2), 2 mmol of a manganese source, 1 mmol of a titanium source, 1 mmol of a chromium source, 2.07 mmol of anhydrous sodium citrate, and 0.41 mL of phosphoric acid (85%) were weighed and added into the solution in sequence, and a resulting mixture was mixed at 70° C. to obtain a spinning solution; the spinning solution was transferred into an 8 mL disposable syringe and then the syringe was put into an electrostatic spinning device for electrostatic spinning; and conditions for the electrostatic spinning included: an advancing speed of 0.08 mm/min, a distance of 12 cm between a spinning nozzle (syringe needle) and a receiver (the receiving roller), and a spinning voltage of 14 kV;
in the step 3), the spinning product was heated to 300° C. for 2 h at 2° C./min in a muffle furnace, and then was heated to 750° C. under an argon atmosphere in a tube furnace for 6 h at a rate of 3° C./min; and
the remaining steps and parameters were the same as those in Example 1 to obtain the sodium-chromium-titanium-manganese phosphate self-supporting electrode material $Na_{3.1}Cr_{0.1}Ti_{0.9}Mn(PO_4)_3$.

The $Na_{3.1}Cr_{0.1}Ti_{0.9}Mn(PO_4)_3$ prepared according to Example 5 was used as a cathode material of a sodium-ion battery to prepare the sodium-ion battery according to the above method, and the sodium-ion battery was tested.

It was measured that the sodium-ion battery assembled with the $Na_{3.1}Cr_{0.1}Ti_{0.9}Mn(PO_4)_3$ had an average discharge voltage of 2.6V, a specific discharge capacity of 153 mAh/g after 50 cycles at a current density of 50 mA/g, and a capacity retention rate of more than 94%.

In summary, with regard to the use of the sodium-chromium-titanium-manganese phosphate self-supporting electrode material prepared according to the present disclosure as the cathode active material of the sodium-ion battery, the material can be directly used for assembling the sodium-ion battery, without the need of a current collector, a binder, or additional conductive carbon, exhibits a high average voltage and a reversible specific capacity, and shows obvious advantages in terms of energy density, cycling stability, and rate performance. With regard to the prepared sodium-chromium-titanium-manganese phosphate self-supporting electrode material, by adjusting the ratio of chromium and titanium in the material and synthesis conditions, the material structure can be optimized, the voltage platform of the material can be significantly regulated and controlled, and the average voltage and cycling stability of the material can be improved.

Although the present disclosure is disclosed as above, the protection scope disclosed in the present disclosure is not limited thereto. Those skilled in the art can make various changes and modifications without departing from the spirit and scope of the present disclosure, and all these changes and modifications shall fall within the protection scope of the present disclosure.

What is claimed is:

1. A sodium-chromium-titanium-manganese phosphate self-supporting electrode material, wherein the sodium-chromium-titanium-manganese phosphate self-supporting electrode material is a composite material of sodium-chromium-titanium-manganese phosphate and carbon, and the sodium-chromium-titanium-manganese phosphate has a chemical formula of $Na_{3+x}Cr_xTi_{1-x}Mn(PO_4)_3$, wherein $0<x<1$.

2. A method for preparing the sodium-chromium-titanium-manganese phosphate self-supporting electrode material according to claim 1, comprising the following steps:
S1: dissolving a carbon-containing polymer into a solvent to obtain a solution;
S2: mixing a sodium source, a manganese source, a titanium source, a chromium source, and a phosphorus source with the solution to obtain a spinning solution, and subjecting the spinning solution to electrostatic spinning to obtain a spinning product; and S3: after pretreating the spinning product, calcining same to obtain the sodium-chromium-titanium-manganese phosphate self-supporting electrode material.

3. The method according to claim 2, wherein in the step S1, the carbon-containing polymer comprises at least one of polyacrylonitrile, polyethylene oxide, polyvinylidene fluoride, polymethacrylate, polyvinyl carbazole, polybenzimidazole, polyethylene terephthalate, polymethyl methacrylate, polystyrene, polyurethane, polylactic acid, polyvinylpyrrolidone, and polyvinyl alcohol.

4. The method according to claim 3, wherein in the step S1, the solvent comprises at least one of dimethylformamide, dimethylacetamide, dimethyl sulfoxide, ethylene carbonate, and water.

5. The method according to claim 2, wherein in the step S2, based on a molar ratio of sodium, manganese, titanium, chromium, phosphate, and carbon, the sodium source, the manganese source, the titanium source, the chromium source, the phosphorus source, and the carbon-containing polymer have a molar ratio of $(3+x):1:(1-x):x:3:(0.2-5)$, wherein $0<x<1$.

6. The method according to claim 5, wherein the sodium source comprises at least one of disodium hydrogen phosphate, sodium dihydrogen phosphate, sodium acetate, sodium oxalate, sodium citrate, sodium carbonate, sodium bicarbonate, and sodium hydroxide;

the manganese source comprises at least one of manganese acetate, manganese nitrate, manganese carbonate, and manganese acetylacetonate;

the titanium source comprises at least one of dihydroxybis (ammonium lactato)titanium(IV), titanium dioxide, tetrabutyl titanate, isopropyl titanate, and tetraethyl titanate;

the chromium source comprises at least one of chromium acetate, chromium acetate hydroxide, and chromium nitrate; and the phosphorus source comprises at least one of phosphoric acid, disodium hydrogen phosphate, sodium dihydrogen phosphate, and ammonium dihydrogen phosphate.

7. The method according to claim 6, wherein in the step S2, conditions for the electrostatic spinning comprise a voltage of 10 kV to 30 kV, a distance of 10 cm to 25 cm between a spinning nozzle and a receiver, and an advancing speed of 0.01 mm/min to 0.5 mm/min.

\* \* \* \* \*